United States Patent
Dawson

[15] 3,705,736
[45] Dec. 12, 1972

[54] JOINTS FOR FLEXIBLE DUCTING

[72] Inventor: Gordon Bertram Dawson, Worcester, England

[73] Assignee: Dowty Meco Limited, Worcester, England

[22] Filed: March 3, 1971

[21] Appl. No.: 120,533

Related U.S. Application Data

[63] Continuation-in-part of Ser. No. 825,906, May 19, 1969, abandoned.

[30] Foreign Application Priority Data

Feb. 6, 1969 Great Britain..........................6,398/69
June 27, 1969 Great Britain........................32,558/69
March 6, 1970 Great Britain......................10,948/70

[52] U.S. Cl. ........................285/260, 24/19, 285/417
[51] Int. Cl. ..............................................F16l 31/00
[58] Field of Search .285/260, 417; 24/30.5 TC, 266, 24/19, 1, 27, 201 C; 2/270

[56] References Cited

UNITED STATES PATENTS

| | | | |
|---|---|---|---|
| 575,362 | 1/1897 | Luther | 24/266 |
| 1,211,067 | 1/1917 | Braly | 285/260 X |
| 1,861,296 | 5/1932 | Braly | 285/260 |
| 1,948,909 | 2/1934 | Evans | 285/260 X |
| 2,236,676 | 4/1941 | Dinsmoor | 24/30.5 T |
| 2,595,408 | 5/1952 | Quest | 285/260 X |
| 282,466 | 7/1883 | Preston | 24/27 |
| 690,819 | 1/1902 | Anderson | 24/27 |

FOREIGN PATENTS OR APPLICATIONS

| | | | |
|---|---|---|---|
| 1,283,334 | 12/1961 | France | 2/270 |
| 1,098,702 | 1/1968 | Great Britain | 285/260 |
| 499,532 | 11/1954 | Italy | 24/30.5 T |
| 675,155 | 3/1966 | Belgium | 285/260 |

*Primary Examiner*—Thomas F. Callaghan
*Attorney*—Scrivener, Parker, Scrivener & Clarke

[57] ABSTRACT

A joint is made between two lengths of flexible ventilation ducting by tightening around a seam on an end of one length of ducting an endless ring of flexible strand located in a seam on the adjacent end of another length.

11 Claims, 8 Drawing Figures

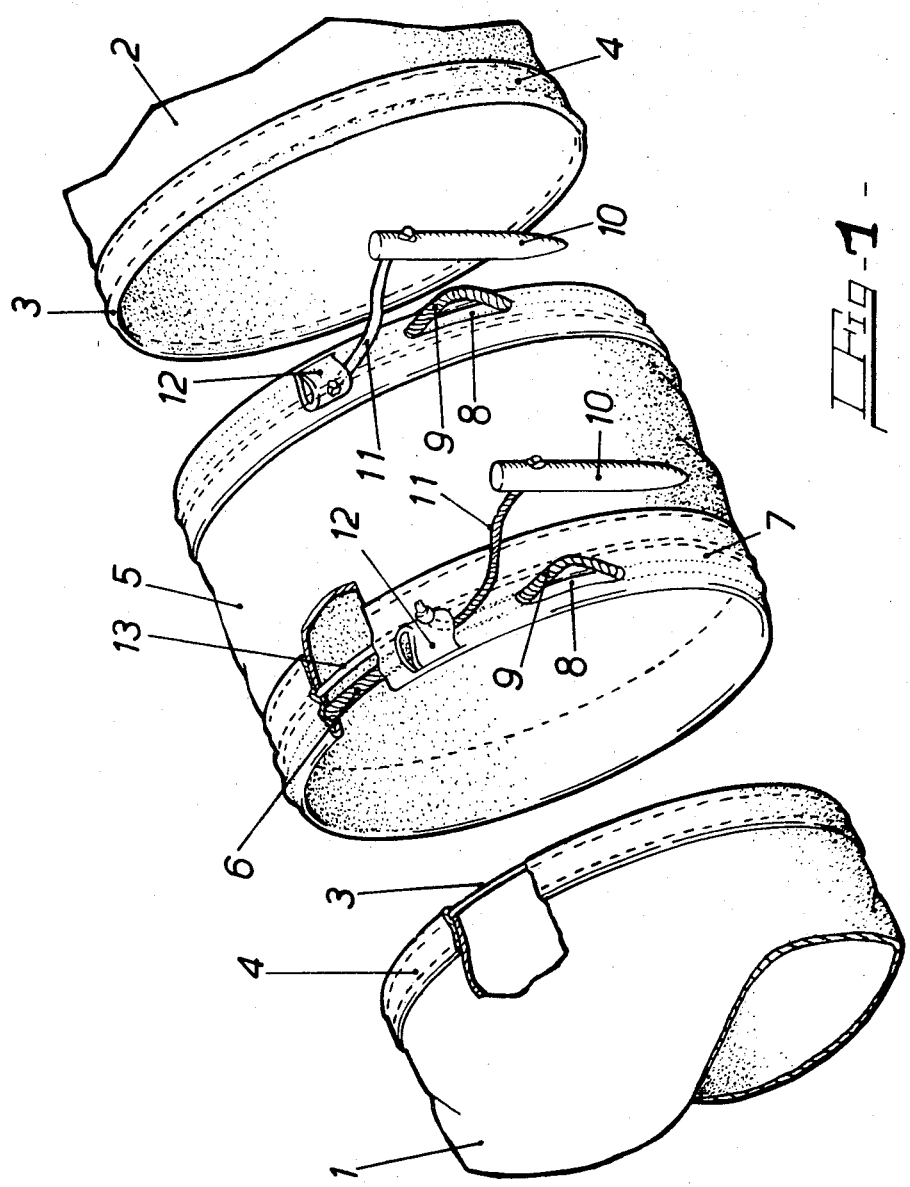

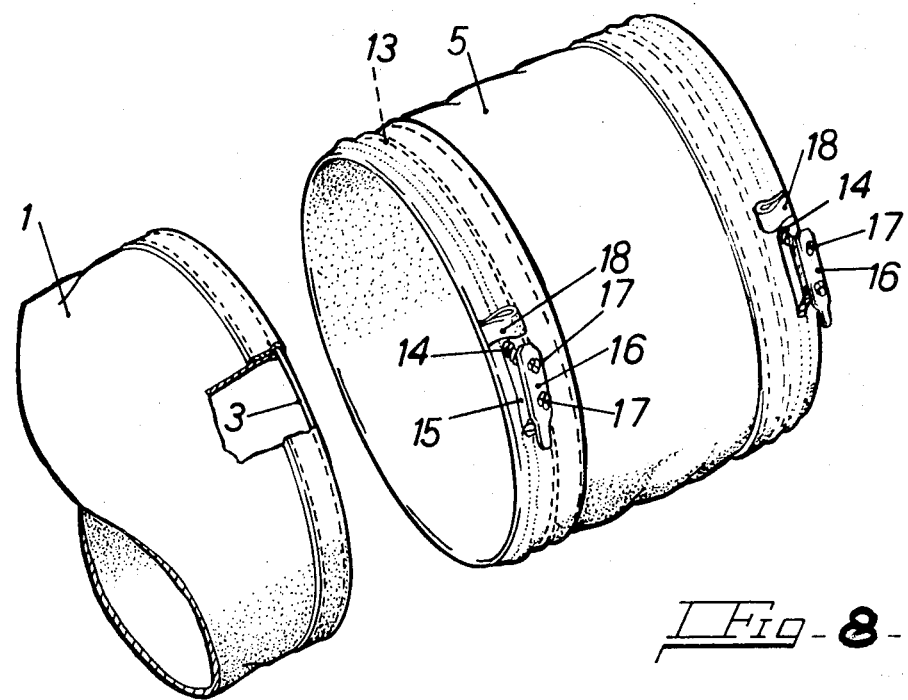

JOINTS FOR FLEXIBLE DUCTING

This application is a continuation-in-part of my U.S. application Ser. No. 825,906, filed May 19, 1969 and now abandoned.

This invention relates to a joint for connecting lengths of flexible ducting of the kind used for carrying air for ventilation in mines and other underground workings and in other confined spaces where a supply of air at low pressure is required.

Such ducting is commonly formed of fabric coated with rubber or plastic to render it impermeable and may be reinforced and supported against transverse collapse by internal wire rings or by a continuous helical wire.

Various means have been proposed for connecting lengths of such ducting but none of them has proved entirely satisfactory in practice.

Our invention comprises means for connecting the adjacent ends of lengths of flexible ducting of the kind set forth in which a hollow bead or seam at one end of a length of ducting houses an endless length of rope or similar flexible strand of which a portion is exposed through an opening in the bead or seam and is adapted to be twisted to contract the bead or seam around a bead or seam on the end of a second length of ducting which has previously been inserted into the bead or seam housing the rope.

To connect two lengths of ducting the end of one length having rope in the seam is fitted over the end of the next length having a wire ring in the seam, slack rope is drawn out of the slot to form a loop, and a pin or bar is passed through the loop and used to twist it to tighten the rope and close that end of the ducting in around the other end. The pin or bar is then engaged in a keeper such as a fabric loop on the outside of the ducting to prevent the loop from untwisting.

Our invention further comprises, as an article of manufacture for connection at its ends to adjacent lengths of flexible ducting of the kind set forth, a length of flexible ducting having at one end a hollow bead or seam housing a wire ring or rings and at the other end a hollow bead or seam housing an endless length of rope or similar flexible strand which is exposed at one or more points through a part-circumferential slot or slots in the seam. The invention also contemplates a short sleeve having flexible strand material in seams at both ends of the sleeve whereby the sleeve may be used to interconnect a pair of lengths of flexible ducting equipped only with metal rings in seams at both ends of each length of ducting.

Four examples of our invention are illustrated in the accompanying drawings in which:

FIG. 7 is a perspective view of a connecting sleeve incorporating the invention at both of its ends; and FIG. 8 is a perspective view similar to FIG. 7 showing a modification.

In FIGS. 1, 2, 3 and 4 the adjacent ends of two lengths 10, 11 of ducting are shown. The ducting is made in the usual way of fabric coated with rubber or plastic to render it impermeable.

Figure 4:
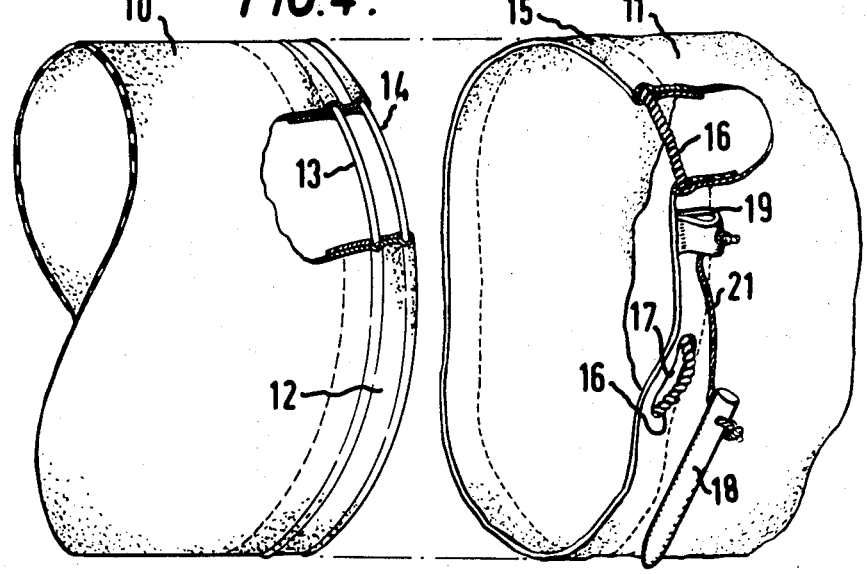
FIG. 4 is a perspective view similar to FIG. 1, but having portions of the end seams on the ducting cut away to show the construction.

On the end of the length 10 there is a hollow bead or seam 12 housing two axially spaced wire rings 13, 14 as shown more particularly in FIG. 4. The bead or seam 12 is formed by locating the wire rings over the ducting, folding the end back over the rings, and stitching between the rings and on the inner side of the inner ring 13. On the end of the length 11 there is a continuous hollow circumferential bead or seam 15 having a part-circumferential slot or opening 17 therein. Housed within the seam throughout its length is a rope 16 having interconnected parts extending towards each other outwardly of the opening 17 and forming an endless flexible rope ring.

Figure 2:
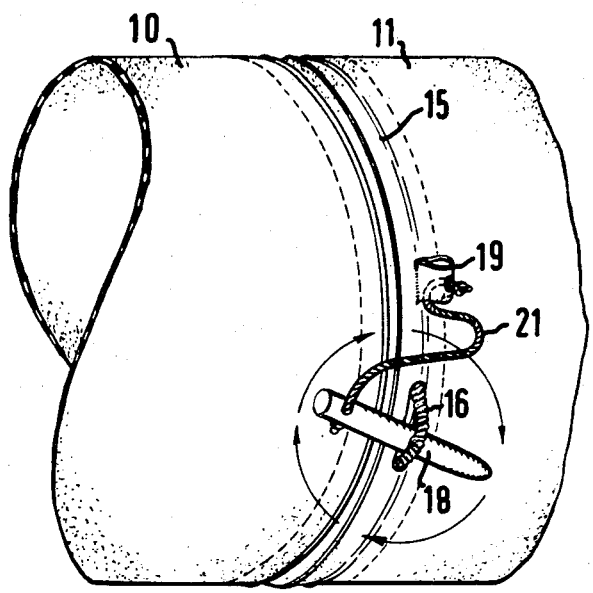
FIG. 2 is a perspective view showing the ends of the lengths interengaged and the method of closing one end around the other.

To join the two lengths of ducting together the end of the length 10 is inserted into the end of the length 11 as shown in FIG. 2 until the rope ring 16 is located in an axial direction between the wire rings 13, 14.

Figure 3:
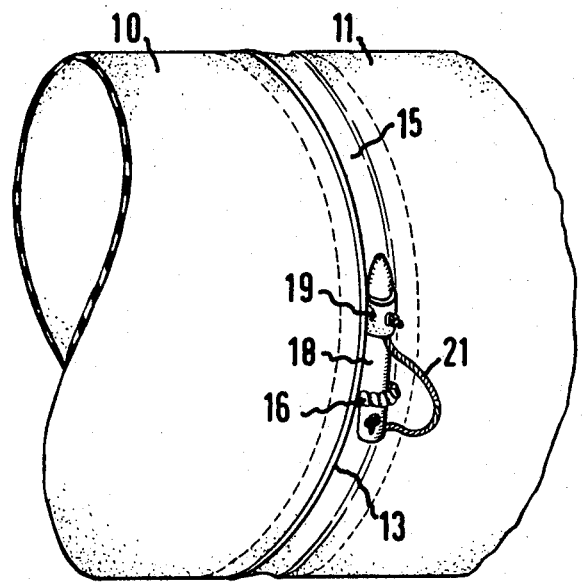
FIG. 3 is a perspective view of the completed joint.

There is sufficient slack in the rope ring to allow the part exposed in the slot 17 to be pulled out to form a loop. A peg 18 is inserted through the loop as shown in a twisting member or FIG. 2 and twisted to tighten the rope and close the end of the length 11 in around the end of the length 10 and make an airtight joint between the two lengths. The peg is then engaged in a keeper as shown in FIG. 3 to prevent the loop from untwisting, the keeper conveniently being formed by a fabric loop 19 stitched to the outer face of the seam 15 adjacent to the slot 17.

In the form illustrated the peg 18 is made of wood but it can be made of any suitable material and it is preferably attached at one end by a cord 21 to the loop 19 to prevent it from being mislaid.

Figure 5:
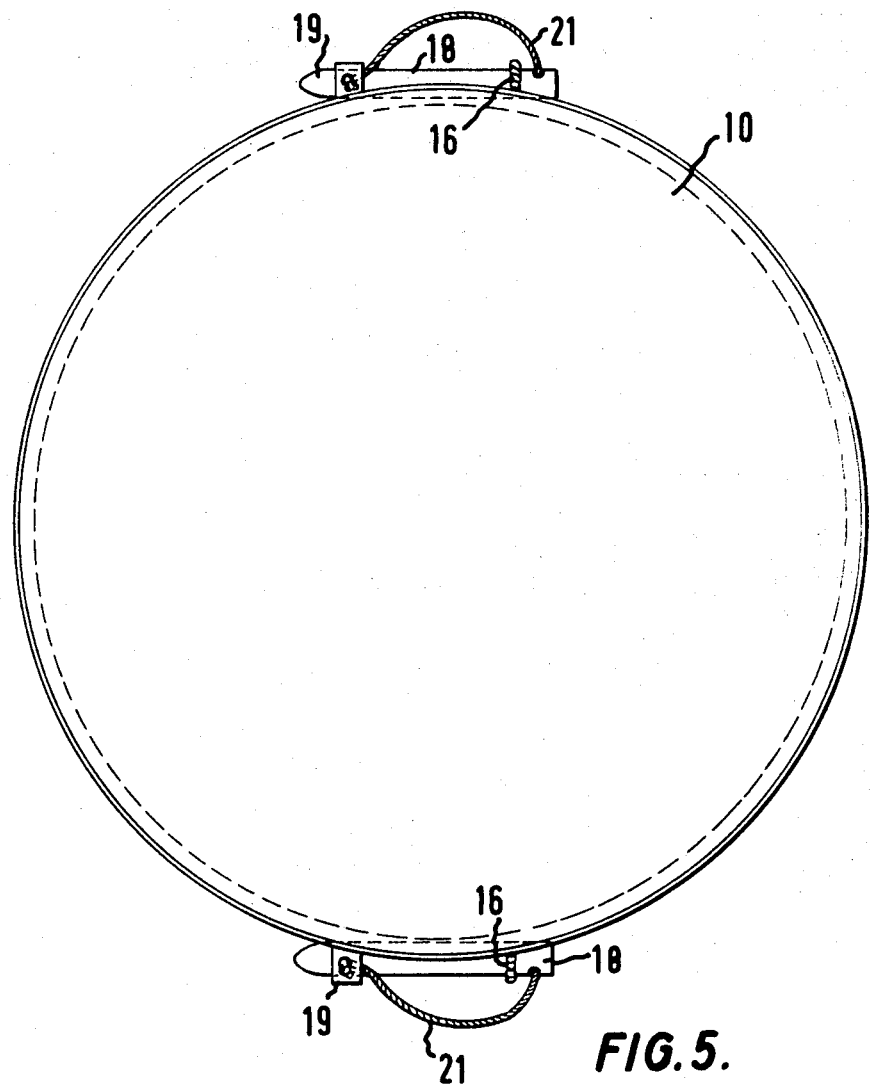
FIG. 5 is a section adjacent to a joint in ducting of large diameter.

In ducting of large diameter provision may be made for tightening the rope ring at two or more points as shown in FIG. 5 where there are two diametrically opposed tightening points.

Where the ducting is reinforced by an internal helical wire the inner wire ring 13 in the joint may be an end coil of the reinforcing helix.

Our improved joint for flexible ducting has a number of practical advantages. Amongst these are that it is simple and economical to manufacture, has no parts liable to break or to go out of action, and is very easy to operate both in making and in breaking the joint between lengths of ducting.

In the examples illustrated and described above the bead or seam on one length of ducting houses two axially spaced wire rings, and in the assembled joint the bead or seam on the other length is contracted by the rope ring into the annular space between the two wire rings in the bead or seam on the first length.

There are large quantities of ducting in use in which there is only a single wire ring in a bead or seam at each end of a length of ducting, a joint between two lengths being made by deforming the ring on the end of one length, inserting it through the ring on the end of another length, and releasing it. This has been a common way of connecting lengths of ducting for many years, but it is not entirely satisfactory in use.

Figure 6:
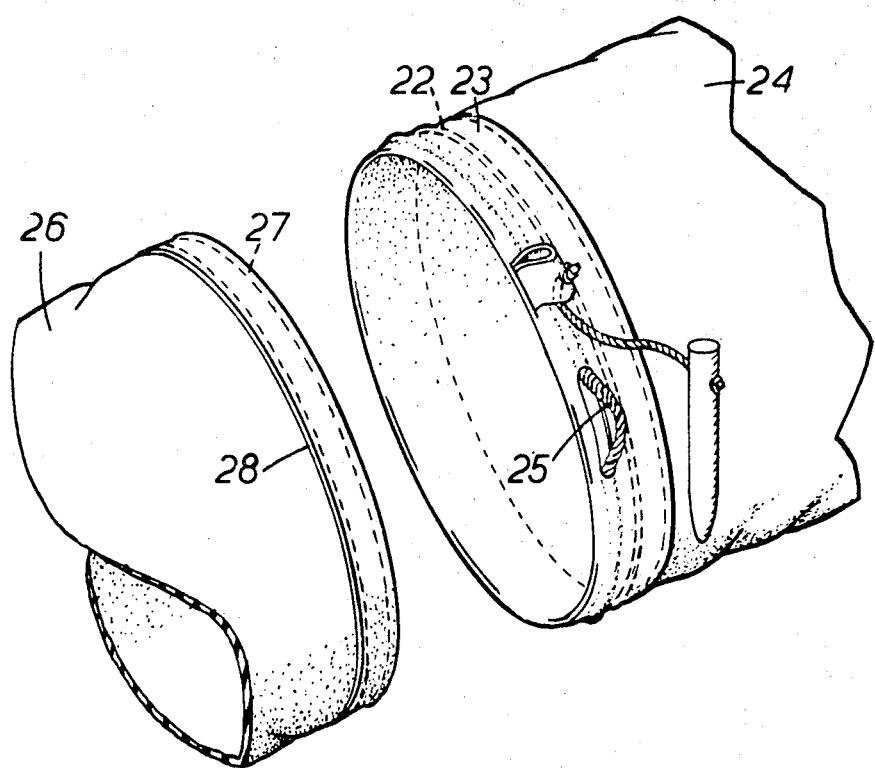
FIG. 6 is a perspective view similar to FIG. 1 but showing a modification.

To adapt our invention to such ducting the arrangement shown in FIG. 6 can be employed. In this arrangement a wire ring 22 is incorporated in a seam 23 on an end of a length of ducting 24 which also houses a rope ring 25 corresponding to the rope ring 16 in the embodiments described above. The wire ring is adjacent to but spaced axially from the rope ring.

To make a joint the end of another length of ducting 26 incorporating a single wire ring 27 located in a seam 28 is inserted into the length 24 until the ring 27 is located between the rope ring 25 and the wire ring 22 so that when the rope ring is tightened an effective and stable airtight joint is made between the two lengths of ducting.

The wire ring may be located on either side of the rope ring but will usually be on the inner side as shown in FIG. 6. The rope ring and the wire ring may both be housed in the same bead or seam which is formed by locating the rope and the wire ring over the ducting, folding the end back over them, and stitching between the rope and the wire ring and on the inner side of the wire ring. The bead or seam 23 will, of course, incorporate a part-circumferential slot through which a loop of the rope can be drawn for twisting.

In a modification, the wire ring 22 adjacent to the rope may be replaced by a second rope ring so that the two rope rings can be tightened on opposite sides of a wire ring in the end of the second length of ducting when a joint is made.

With either arrangement it is then only necessary to provide a single wire ring in one end of a length of ducting provided with a contractible rope ring or rings at the other end.

FIGS. 7 and 8 illustrate another application of the invention for connecting together lengths of flexible ducting equipped at their ends only with wire rings enclosed in seams.

Figure 1:
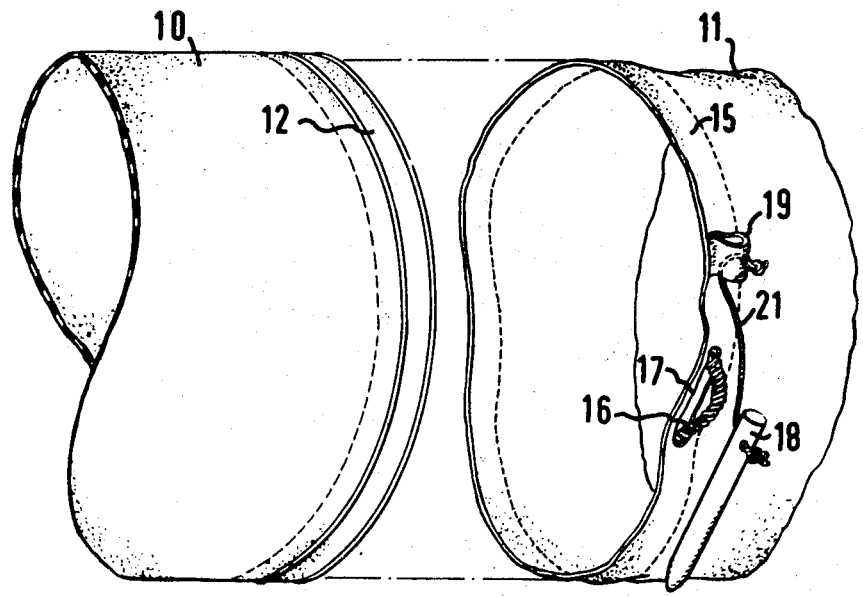
FIG. 1 is a perspective view of the adjacent ends of two lengths of ducting to be connected.

With reference to FIG. 7, 1 and 2 are two lengths of flexible ducting such as are used for conveying air for ventilation in mines. A continuous ring 3 of resilient wire is housed in a continuous circumferential seam 4 in the end of each length of ducting. The two lengths of ducting are adapted to be connected in an airtight manner by a connector 5. This comprises a short sleeve of similar ducting having in each end means for contracting it around the end of the ducting 1 or 2 after that has been inserted into the connector.

An endless ring 6 of rope or similar strand is housed in a continuous circumferential seam 7 on each end of the connector. A portion of the rope is exposed in a part-circumferential slot 8 in the seam 7 and can be drawn out to form a loop 9. A peg 10' attached by a cord 11' to a fabric keeper loop 12' stitched to the outside of the seam 7 is adapted to be inserted through the loop 9 in the rope ring and used to twist the loop and so to shorten the rope ring and contract the seam 7.

The seam 7 also houses a wire ring 13' spaced axially from the rope ring 5.

To connect the lengths of ducting the end of the length 1 is inserted into the adjacent end of the connector until the wire ring 3 in the end of the length 1 lies between the rope ring 6 and the wire ring 13' in the seam of the connector. The rope ring is then tightened as described above to contract the seam 7 on the connector and make an airtight joint with the length of ducting 1. After this has been done the peg 10' is engaged in the keeper loop 12' to prevent the loop in the rope ring from untwisting.

The other end of the connector is then connected in the same way to the length of ducting 2.

In the modification shown in FIG. 8 the endless ring of rope 6 is replaced by a length of rope 14' of which the end parts are brought out towards each other through a slot 14 in the seam 6 and are interconnected outwardly of the opening by spaced holes in a wooden or other bar 16'. The extremities of the rope are knotted as shown at 17' or otherwise treated so that they cannot come back through the bar.

The bar 16' is rotated about an axis substantially at right angles to the axis of the connector to twist the ends of the rope together and contract the seam on the connector. Untwisting is prevented by engaging an integral extension 19' at one end of the bar in a keeper loop 18' stitched to the outside of the seam.

What is claimed is:

1. A flexible ventilating duct having at one end a continuous circumferential seam containing an opening, flexible, rope-like, strand material received in said seam throughout the length thereof and having parts extending from opposite directions toward each other outwardly of said opening, said parts being interconnected outwardly of said opening with sufficient slack to receive between them a substantially rigid twisting member for twisting said parts about themselves upon rotation of a twisting member to shorten said strand material and contract said seam, and releasable keeper means carried by said duct and adapted to cooperate with a twisting member to prevent said parts from untwisting after twisting thereof by said member.

2. The duct of claim 1 including a second continuous circumferential seam at the opposite end of the duct, and at least one wire ring housed in said second seam.

3. The duct of claim 1 wherein said seam encloses a wire ring spaced axially from said flexible rope-like strand.

4. The duct of claim 1 wherein said seam is formed with two angularly spaced openings through which different portions of said flexible rope-like strand are exposed.

5. The duct of claim 1 including a twisting member comprising a captive pin.

6. The duct of claim 1 including a rigid stick-like member, each of the outwardly extending parts of said strand material having longitudinally spaced connections with said stick-like member arranged so that upon rotation of said member said parts are twisted about themselves, and means carried by said member for cooperation with said keeper means to prevent said parts from untwisting after twisting thereof by said member.

7. The duct of claim 6 wherein said connections comprise openings at spaced positions on said stick-like member, the respective parts of said strand material passing through said openings, and means for preventing said parts from being withdrawn from said openings, said keeper means comprising a loop on said ducting adjacent said opening in said seam, and an extension integral with said stick-like member and engageable with said loop.

8. A joint between lengths of flexible duct comprising a continuous circumferential seam on the end of one duct, at least one wire ring within said seam, said seam and said ring being received within the end of a second duct having a continuous circumferential seam thereon containing a part circumferential opening, flexible, rope-like strand material received in said second named seam throughout the length thereof and having interconnected parts extending from opposite directions towards each other outwardly of said opening, a twisting member between said parts and imparting twist to said parts to shorten said rope-like strand material and contract its seam about the seam and wire ring on the end of said first duct, and releasable keeper means carried by said second duct and cooperating with said twisting member to retain said parts in twisted condition.

9. The joint of claim 8 wherein the seam on the end of the first duct encloses in addition a second axially spaced wire ring.

10. Means for connecting two lengths of ducting each having a single wire ring in each end comprising a short length of ducting having at each end a continuous circumferential seam containing an opening, flexible, rope-like, strand material received in said seam throughout the length thereof and having parts extending from opposite directions toward each other outwardly of said opening, said parts being interconnected outwardly of said opening with sufficient slack to receive between them a substantially rigid twisting member for twisting said parts about themselves upon rotation of a twisting member to shorten said strand material and contract said seam, and releasable keeper means carried by said duct and adapted to cooperate with a twisting member to prevent said parts from untwisting after twisting thereof by said member.

11. Means as in claim 10 wherein the same at each end of said short length of ducting further encloses a wire ring spaced axially from the rope-like strand material.

* * * * *